US008882936B2

(12) United States Patent
Hasegawa et al.

(10) Patent No.: US 8,882,936 B2
(45) Date of Patent: Nov. 11, 2014

(54) HIGH-TENSILE STEEL WITH EXCELLENT WELDABILITY AND TOUGHNESS AND WITH TENSILE STRENGTH OF 550 MPA CLASS OR MORE AND METHOD OF PRODUCTION OF THE SAME

(75) Inventors: Yasushi Hasegawa, Futtsu (JP); Naoki Saitoh, Tokai (JP); Youichi Tanaka, Futtsu (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 1513 days.

(21) Appl. No.: 11/661,054

(22) PCT Filed: May 2, 2005

(86) PCT No.: PCT/JP2005/008655
§ 371 (c)(1),
(2), (4) Date: Feb. 21, 2007

(87) PCT Pub. No.: WO2006/022053
PCT Pub. Date: Mar. 2, 2006

(65) Prior Publication Data
US 2011/0129381 A1 Jun. 2, 2011

(30) Foreign Application Priority Data
Aug. 24, 2004 (JP) .................. 2004-243459

(51) Int. Cl.
| C22C 38/00 | (2006.01) |
| C22C 38/12 | (2006.01) |
| C22C 38/02 | (2006.01) |
| C21D 8/02 | (2006.01) |
| C21D 8/00 | (2006.01) |
| C22C 38/04 | (2006.01) |
| C22C 38/14 | (2006.01) |
| C22C 38/06 | (2006.01) |

(52) U.S. Cl.
CPC .............. *C21D 8/0247* (2013.01); *C22C 38/12* (2013.01); *C22C 38/02* (2013.01); *C21D 8/021* (2013.01); *C21D 8/00* (2013.01); *C22C 38/04* (2013.01); *C22C 38/14* (2013.01); *C21D 2211/002* (2013.01); *C22C 38/06* (2013.01); *C21D 2211/004* (2013.01)
USPC .......................................... 148/320; 420/106

(58) Field of Classification Search
CPC ............. C22C 38/00; C21D 2211/002; C21D 2211/004; C21D 8/00
USPC ........................................ 420/106; 148/320
See application file for complete search history.

(56) References Cited

U.S. PATENT DOCUMENTS 6,818,072 B2 * 11/2004 Kondo et al. ................. 148/320
7,396,420 B2 * 7/2008 Matsuoka et al. ............ 148/320

FOREIGN PATENT DOCUMENTS

| JP | 57-19744 | 4/1982 |
| JP | 04-350119 | 12/1992 |

(Continued)

OTHER PUBLICATIONS
Machine translation of JP 10017929A (Jan. 20, 1998).*

(Continued)

*Primary Examiner* — Jie Yang
(74) *Attorney, Agent, or Firm* — Kenyon & Kenyon LLP (57) ABSTRACT

The present invention provides a high-tensile steel material having a tensile strength of the 550 MPa class or more which can simultaneously raise the strength and toughness of the heat affected zone of weld to equal those of the matrix and a method of production of the same, that is, a high-tensile steel material with excellent weldability and toughness and with tensile strength of the 550 MPa class or more containing, by mass %, C: 0.005 to 0.10%, W: 0.10 to 3.0%, Nb: 0.010 to 0.080%, and V: 0.010 to 0.50%, limiting the Ti to less than 0.005%, satisfying equation; EC=2[C]−[Nb]/9−[V]/12>0.020, having an amount of precipitation of W contained in the steel material, in terms of analytical value obtained by quantitative analysis of potential electrolysis extraction residue by fluorescent X-ray analysis, of 0.0050% or less, and having 60% or more of its structural composition in a cross-section of the steel as a bainite structure.

5 Claims, 1 Drawing Sheet (56) References Cited

FOREIGN PATENT DOCUMENTS

| | | |
|---|---|---|
| JP | 07-331382 | 12/1995 |
| JP | 08-225884 | 9/1996 |
| JP | 2633743 | 4/1997 |
| JP | 09-217146 | 8/1997 |
| JP | 09-271806 | 10/1997 |
| JP | 10-17929 A | 1/1998 |
| JP | 10-046290 | 2/1998 |
| JP | 2987735 | 10/1999 |
| JP | 3256118 | 11/2001 |
| JP | 2003-3229 | 1/2003 |
| JP | 2003-313630 | 11/2003 |
| JP | 2003321729 A * | 11/2003 |
| JP | 2004-204344 A | 7/2004 |

OTHER PUBLICATIONS

Machnie translation of Yoshie Atsuhiko et al, JP 07-109543 A, listed as a foreign patent in IDS marked Apr. 7, 2011, Apr. 1995.*
NPL: Machine translation of JP 2003321729 A, Nov. 2003.*

* cited by examiner

HIGH-TENSILE STEEL WITH EXCELLENT WELDABILITY AND TOUGHNESS AND WITH TENSILE STRENGTH OF 550 MPA CLASS OR MORE AND METHOD OF PRODUCTION OF THE SAME

TECHNICAL FIELD

The present invention relates to high-tensile steel having a tensile strength of 550 MPa or more, more particularly a tensile strength in the rolling direction of steel plate of 550 MPa or more, using mainly welding when assembled into various types of structural materials or machine parts and used for building, and requiring joint characteristics of specifications equivalent to that of the matrix, for example, various types of steel materials for shipbuilding, bridges, and buildings and further steel materials used when producing a pressure vessels used at a temperature of room temperature or less.

BACKGROUND ART

So-called low carbon steel with a carbon content of 0.3% or less is excellent in workability and weldability and is used in many structures. Buildings, vehicles, ships, industrial machinery, etc. use such low carbon steel to form frames, inside partitions, or outer shells. The structural members mainly provide the required strength. In "mild steel" with reduced C, there has been considerable development of technology for raising its strength extremely high to reduce the weight of the structural members. By means of raising the specific strength (intensity per unit mass) of steel, welded structures have achieved larger and more complicated structures and furthermore secured safety though the increase in the strength of steel.

However, to raise the strength of low carbon steel, a large amount of alloy elements other than carbon have to be added. Alternatively, there were the problems that this led to increased complexity of the system for strict control of the crystal structure when producing the steel or otherwise led to a drop in productivity or rise in production cost in return for the higher strength or workability. In particular, in recent years, attempts have been made to reduce the welding process unavoidable at the time of production of structural members as much as possible. Technology increasing the weld input heat has been developed. As a result, the input heat at the time of welding often exceeds 50,000 J/cm. Welding is even being performed with an input heat exceeding 100,000 J/cm in some cases and 200,000/cm in buildings. In the case of such high weld input heat, the welded material receives a large heat effect, is exposed to a high temperature of 1400° C. near the molten metal, and is exposed to a temperature of the $A_3$ transformation temperature of steel, 900° C. or more, that is, the range of the so-called "heat affected zone of weld" is broadened.

As a result, in this heat affected zone of weld, the structure of low carbon steel produced by strictly controlling the structure changes to an uncontrollable form of structure determined by the rise in temperature due to the large weld input heat and the subsequent cooling rate of the weld joint. Whether or not heat treatment of an extent of annealing for removing the residual stress after welding is performed, this heat treatment is not reheating to the transformation temperature or more, so it is difficult to improve the transformed structure.

In such a weld heat affected zone as well, the structural member is required to maintain characteristics similar to those of sound parts not affected by the weld heat. In the final analysis, bringing out the characteristics of the steel material at this heat affected zone of weld becomes the most important issue. Technical development to secure this has mainly focused on development of new steel materials.

An invention relating to a steel material utilizing nitrides or oxides resistant to breakdown at a high temperature so as to prevent an increase in the prior γ grain size in the crystal structure, particularly near the fusion line, is disclosed in Japanese Patent Publication (B) No. 57-19744, Japanese Patent No. 3256118, etc. However, in the high-tensile steel having a strength of 550 MPa or more and having a structure comprised of at least 60% bainite covered by the present invention, even if applying these inventions, the above-mentioned mode at the time of production of the structure performed for bringing out the strength of the material, that is, a grain size equal to that of the matrix, dislocation density, and dispersion density of precipitates, end up changing due to the retransformation caused by the heat effect at the time of welding, so is difficult to reproduced. Even if a toughness equal to that of the matrix can be secured, the problem remains that it is difficult to obtain a strength at such a heat affected zone equal to that of the matrix.

On the other hand, the technique of adding Ni, Cr, Mo, etc. to improve the hardenability of the steel material and secure the strength is naturally appropriate thinking in alloy design. However, Ni and Mo are expensive elements. Industrially, adding large amounts of for example over 5% to structural steel is not practical. When limiting the amounts of addition to avoid a large rise in cost, there is less effect. The increase in cost becomes a problem, so this is not a practical solution. Further, Cr easily causes precipitation embrittlement. In exchange for the rise in strength, the toughness has ended up being lost. The same is true even when adding large amounts of Nb, V, Ti, and other elements. When trying to obtain a good balance of characteristics in the heat affected zone of high-tensile steel, industrially a stalemate has been reached in almost all cases.

On the other hand, while the mechanism is not clear, in the technology adding W to improve the strength of steels, numerous technologies focusing on heat resistant steel have been developed. Japanese Patent Publication (A) No. 10-46290, Japanese Patent Publication (A) No. 8-225884, and Japanese Patent Publication (A) No. 9-217146 describe inventions relating to heat resistant steel containing Cr in an amount of 0.8% or more where W is included in an amount of 0.01 to 3.5% for the purpose of improving the creep rupture strength. However, these are all aimed at improvement of the creep characteristic. When it comes to achieving both strength and toughness at the heat affected zone of weld, since the temperature specification of heat resistant steel is even at the lowest 400° C. or more, there is almost no demand for toughness. Even when there is, it concerns cracking at the time of installation or damage at the time of water pressure tests. Further, in high temperature, high pressure power generating plants or petrochemical plants traditionally made of heat resistant steel, welding conditions with high input heat are not employed at all due to the concern over embrittlement of the weld joints. Therefore, W is added not so as to control the characteristics of the heat affected zone of weld due to the input heat. Further, the form of presence in the steel also naturally differs. Securing the properties at the heat affected zone during large input heat welding performed on structural members at room temperature or less covered by the present invention is not considered. Due to the chemical composition, even if applying large input heat welding, as a general rule the toughness inevitably remarkably drops.

Further, as technology for adding W to a structural material used at room temperature or less, there is the example of application for improving the characteristics of other steel materials. Japanese Patent No. 2633743 discloses an invention relating to a method of production of thick steel plate controlling the grain size to a refined size and describes an invention relating to a steel material to which W is added in a range of 2.0% or less. However, in this case, W is added for the purposes of improving the hardenability of the steel material, so there is no description relating to the ratio of precipitation. Therefore, the technology for effectively utilizing solution strengthening is not seen at all.

Japanese Patent Publication (A) No. 4-350119 describes an invention relating to a method controlling the temperature distribution in the transverse direction of the steel plate so as to control the crystal grains in the sheet plane of the steel plate to be uniform everywhere, but even in this case does not describe the technology, when adding W, of limiting the amount of precipitation for the purpose of improving the hardenability. That is, there is no description of the art of positively utilizing the in-grain solution strengthening of W. Similarly, Japanese Patent Publication (A) No. 9-271806 has a description of an invention relating to a method of production of steel plate and steel plate aiming at uniformity of scale at the surface of steel plate, but there is no discovery relating to control of precipitation of W in exactly the same way as the above technologies and positive utilization of solution strengthening is not considered.

Japanese Patent Publication (A) No. 7-331382 and Japanese Patent Publication (A) No. 2003-3229 describe inventions for improving the fatigue strength of a heat affected zone of weld. Only descriptions of adding W in an amount of 0.01 to 2.0% to cause it to act by precipitation strengthening or in-grain solution strengthening are found. However, there is no allusion to the ratio of precipitation. Precipitation as intermetallic compounds is also not mentioned at all. These are aimed at improvement of the strength of the steel material just by adding W. Naturally, when the amount of precipitation is not controlled, even if using these technologies, the goal of the present invention, that is, achievement of a strength and toughness of 550 MPa grade steel at both of the matrix and weld zone is difficult due to the above-mentioned reasons.

On the other hand, a description of an invention simultaneously adding Ti and W and causing W to precipitate to contribute to the strengthening is seen in Japanese Patent Publication (A) No. 2003-313630. However, the technical idea of simultaneously adding Ti and W is also described in Japanese Patent No. 2987735. Further, the method of using heat treatment to control the structure is also described, but breakdown of stable Ti—W—C precipitate etc. should not occur due to its nature. Rather, there is only the finding of defining and making effective use of the amount of precipitation.

Therefore, as explained above, the alloy designs of high-tensile steel in the prior art only relate to inventions using the fact that W always improves the strength of a material by precipitation strengthening as their first actions and effects. In these inventions, inevitably the problems have remained that embrittlement due to precipitates in the heat affected zone of weld is hard to avoid and securing strength and toughness characteristics similar to the matrix at the heat affected zone of weld in a high-tensile steel of a strength of 550 MPa or more was impossible to realize.

DISCLOSURE OF THE INVENTION

The present invention proposes a steel material which solves the problems harbored by conventional high-tensile steel, that is, the problem that in a low carbon steel produced by adjusting the strength-toughness balance of the steel material to obtain a tensile strength of the 550 MPa class or more, it is difficult to simultaneously improve the strength and toughness of the heat affected zone of weld, and simultaneously proposes a method of production for constantly stably obtaining a balance of strength and toughness in steel having this chemical composition.

The present invention solves the above problem in the conventional steel, that is, provides a high toughness high-tensile steel having a tensile strength of 550 MPa or more and requiring that toughness of the heat affected zone of weld be secured in large heat input welding with an input heat of over 50,000 J/cm wherein the joint and matrix are made equal in strength and toughness.

(1) High-tensile steel material with excellent weldability and toughness and with tensile strength of the 550 MPa class or more characterized by containing, by mass %, C: 0.005 to 0.10%, Si: 0.01 to 0.40%, Mn: 0.10 to 3.0%, Al: 0.010 to 0.10%, W: 0.10 to 3.0%, V: 0.010 to 0.50%, and Nb: 0.010 to 0.080%, limiting the P, S, N, O, and Ti as impurities to P: 0.020% or less, S: 0.0040% or less, N: 0.006% or less, O: 0.0060% or less, and Ti: less than 0.005%, having a value of EC of the following equation (1) of over 0.020, having a balance of Fe and unavoidable impurities, having an amount of precipitation of W contained in the steel material, in terms of analytical value obtained by quantitative analysis of potential electrolysis extraction residue by fluorescent X-ray analysis, of 0.0050% or less, and having 60% or more of its structural composition in a cross-section of the steel as a bainite structure:

$$EC=2[C]-[Nb]/9-[V]/12 \qquad (1)$$

where [C], [Nb], [V] are the mass % of the ingredients.

(2) High-tensile steel material with excellent weldability and toughness and with tensile strength of the 550 MPa class or more as set forth in (1), characterized by further containing, by mass %, one or more of
Ni: 0.010 to 0.50%,
Cu: 0.010 to 0.50%, and
Co: 0.010 to 0.50%.

(3) High-tensile steel material with excellent weldability and toughness and with tensile strength of the 550 MPa class or more as set forth in (1) or (2), characterized by containing one or both of Cr: 0.020 to 0.60% and Mo: 0.010 to 0.50% and having a value of EC of the following equation (2) instead of the above equation (1) of over 0.020:

$$EC=2[C]-[Nb]/9-[V]/12-[M] \qquad (2)$$

where, $[M]=[Cr]/23+[Mo]/91$
where [C], [Nb], [V], [Cr], and [Mo] are the mass % of the ingredients.

(4) High-tensile steel material with excellent weldability and toughness and with tensile strength of the 550 MPa class or more as set forth in any one of (1) to (3), characterized by further containing, by mass %, B: 0.0003 to 0.0035%, Ca: 0.0003 to 0.0045%, Mg: 0.0003 to 0.0045%, Y: 0.001 to 0.050%, Ce: 0.001 to 0.050%, and La: 0.001 to 0.050%.

(5) A method of production of high-tensile steel material with excellent weldability and toughness and with tensile strength of the 550 MPa class or more having 60% or more of a structural composition at a cross-section of the steel as a bainite structure and having an amount of precipitation of W contained in the steel material, in terms of analytical value obtained by quantitative analysis of potential electrolysis extraction residue by fluorescent X-ray analysis, of 0.0050% or less, characterized by rough rolling and final rolling a slab having ingredients as set forth in any one of (1) to (4), without heating or heating by sensible heat after casting, then immediately accelerated cooling it or naturally cooling it by a cooling rate of 1° C./s or more so as to obtain a bainite structure, further raising the temperature to a temperature range of 200 to 700° C. in 1 to 240 minutes as the time required for heating, holding it in that temperature range for 10 minutes to 10 hours, then accelerated cooling it or naturally cooling it by a cooling rate of 1° C./s or more.

BEST MODE FOR WORKING THE INVENTION

A steel material excellent in toughness at both the matrix and weld joint and having a strength of the 550 MPa class or more and a method of production of the same of the present invention will be explained below.

First, the reasons for limitation of the chemical composition contained as basic ingredients in the steel material and the chemical composition to be limited as unavoidable impurities so as to achieve the object of the present invention will be explained. Note that in the following explanation, unless specially explained, "%" means "mass %".

C: C is an important element for forming the structure of the steel material and has to be strictly controlled in determining the strength. The present invention relates to high-tensile steel with a tensile strength of 550 MPa or more, so the structure is preferably bainite, martensite, or a mixed structure of bainite and martensite. From this viewpoint, considering the cooling rate and the other alloy additive elements at the time of production of the steel material, the lower limit was made 0.005%. With less than 0.005% of carbon, the strength drops and the high-tensile steel targeted by the present invention cannot be obtained. Further, when C is added over 0.10%, the biggest feature of the present invention, that is, the object of holding of the W in the solid solution state, cannot be achieved in some cases, so the upper limit of addition was made 0.10%. Note that the lower limit of the content of C is defined by the value of EC of the following equations (1) and (2).

Si: Si is effective for deoxidation or in-grain solution strengthening in the production of a steel material. The effect appears from 0.01%. If added over 0.40%, the strengthening action due to the difference in atomic radii with the iron of the base material becomes too large, so conversely the toughness is sometimes impaired, so the upper limit of addition was made 0.40%.

Mn: Mn is an element which raises the hardenability of the steel material and can be utilized for strengthening by the structure. The effect appears from 0.10%, while even if added over 3.0%, strong precipitation occurs in the casting process and sometimes invites breakage of the ingot, so the range of addition was limited to 0.10 to 3.0%.

Al: Al has a strong deoxidizing effect and can control the concentration of oxygen in the steel at the time of tapping and deoxidation or secondary refining of the present invention steel. In addition, besides the deoxidation, it has a high affinity with nitrogen and has the ability to control the concentration of nitrogen in the steel. In the present invention steel, Ti is deliberately limited to prevent precipitation in the steel, but Al fixes nitrogen and precipitation of Ti as a nitride is substantially eliminated, so Al is not only added for the purpose of deoxidation, but also is characterized by limiting the precipitation of the control elements of nitrogen in the steel and in turn the Ti. The effect becomes remarkable from 0.010%. If added over 0.10%, clusters of Al oxides (mainly $Al_2O_3$) are produced in the steel and conversely the toughness of the steel material is impaired, so the range of addition was limited to 0.010 to 0.10%.

W: W is a major essential element added in the present invention steel. The effects of the invention are exhibited by its presence in a solid solution state. The smallest amount of addition required for imparting strain to and strengthening the lattice of the base material as a solid solution element is 0.10%. Addition over 3.0% promotes microsegregation, causes a loss in the uniformity of structure, and results in a bainite structure not being able to be uniformly obtained in some cases and causes deterioration of the toughness, so the range of addition was limited to 0.10 to 3.0%. Note that to add W and hold it in the solid solution state, just defining the amount of addition of W is not enough. It is necessary to make the later mentioned EC value over 0.020 and prevent W from being partially incorporated in the carbides.

Nb: Nb binds with the carbon in the steel and affects the transformation behavior of the steel material. In particular, when rolling the steel material by at the $AC_3$ temperature or less, this is superior in the effect of suppressing the recrystallization of the austenite phase in the constitutionally undercooled state and, further, is also effective for precipitation strengthening when precipitated at the time of heat treatment. The addition has no effect if less than 0.010%, while even added over 0.080%, it tends to precipitate at the grain boundaries as coarse carbides. In that case, the biggest feature of the present invention, the solid solution W, sometimes dissolves in the carbides replacing part of the Nb and thereby indirectly precipitates, so the upper limit of the addition was made 0.08%.

V: V precipitates as a carbide in the same way as Nb, but mainly precipitates during cooling of 500° C. or less or during heat treatment so as to strengthen the steel material through a precipitation strengthening action. Further, the V in the non-precipitated state improves the hardenability of the steel material, induces low temperature transformation, and contributes to the improvement of strength. This effect is manifested from an amount of addition of 0.010%, while if added over 0.50%, this precipitates as coarse grain boundary carbides and similarly partially replaces the W, so reduces the effect of the present invention characterized by holding the W in the solid solution state, therefore the range of addition was limited to 0.010 to 0.50%.

The present invention is characterized in that the amount of precipitation of W contained in the steel material is 0.0050% or less. This is because if the amount of precipitation of W is 0.0050% or less, the in-grain solution strengthening function of W is sufficiently exhibited. Further, if the amount of precipitation of W of the steel material is 0.0050% or less, it is possible to suppress even the precipitation of W at the heat affected zone of weld. As the amount of precipitated W as a target value for this, when using the results of chemical analysis of the constant potential electrolysis extraction residue to measure the absolute value, 0.0050 mass % or less is set. In the present invention, at least 95% of the added W is utilized in the solid solution form. On the other hand, to make the amount of precipitation of W 0.0050% or less, it is not enough to just set independent upper limits on the Nb, V, or other additive elements having a strong carbide forming ability and it is not possible to stably prevent precipitation of W. The first feature of the present invention for making the amount of precipitation of W 0.0050% or less is the simultaneous imposition of limits so that the value of EC shown in the following equation (1) with carbon becomes over 0.020.

$$EC=2[C\%]-[Nb\%]/9-[V\%]/12 \quad (1)$$

This value is a value calculated by an empirical equation obtained by experiments. Unless limiting the amounts of addition of C, Nb, and V so as to satisfy this inequality, the maximum utilization of the solid solution W characteristic of the present invention cannot be achieved.

Note that C is added from the viewpoint of the strength of the steel material and control of the structure, but N is reduced as an impurity, so is not added to the value of EC.

Note that the equation EC was defined based on the following experimental findings.

The present invention and steels deviating from the present invention by having amounts of addition of Nb and V outside the limit of the equation of the EC value at the excess side were melted in amounts of 50 kg, 300 kg, and 2 tons by vacuum melting, cast into ingots, then, as necessary, hot forged etc. to obtain small slabs for rolling. These were hot rolled into steel plates of thicknesses of 15 to 60 mm by a laboratory hot rolling mill. The rolling temperature was changed to various values between 700 to 1000° C. The cooling after the rolling was by natural cooling or water cooling. After that, the material was tempered in accordance with need to give a strength of the 550 MPa class or more and a toughness transition temperature of 0° C. or less. Further, separately the material was reheated to the $Ac_3$ temperature or more to be quenched or was naturally cooled or otherwise re-heat treated and further was tempered one time or more.

Figure 1:
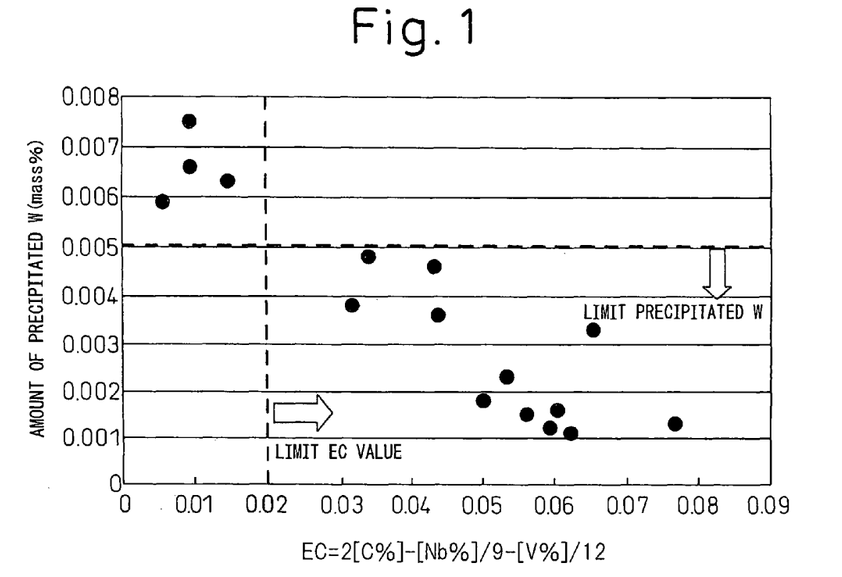
FIG. 1 is a view showing the relationship between the parameter of the EC value defining the chemical composition for limiting the precipitation of W and the amount of precipitated W.

The strength was confirmed to be 550 MPa or more by a No. 4 tensile test piece described in JIS Z2201 from a position of ½ the plate thickness in the direction parallel to the rolling direction of the steel plate, then a No. 4 impact test piece with a 2 mm V-notch described in JIS Z2202 was used to find the ductility-embrittlement fracture transition temperature (hereinafter simply referred to as the "transition temperature"), simultaneously an analytical test piece of 15 mm square was taken from the center position thickness of the steel plate, this was cleared of the residue obtained by constant potential electrolysis by suction filtration, the precipitate trapped on the filter was structurally analyzed by X-ray diffraction and then the amount trapped was detected by a wet-type analysis (mainly dissolution in acid, then analysis by fluorescent X-rays), then the mass of the initially dissolved base material was detected (by weighing the amount of the base material remaining undissolved and calculating the difference from the amount before dissolution) and the ratio of precipitation was found by mass %. FIG. 1 shows the results of this experiment. The abscissa indicates the EC value, while the ordinate indicates the amount of precipitated W. If the EC value is over 0.020, it is clear that the amount of precipitated W will never exceed 0.0050%.

Further, even if the EC value given by the above equation (1) exceeds 0.020, the steel still does not make stable maximum use of the solid solution W. This is important in applying the present invention steel to various applications. In particular, under production conditions where carbides are formed at the boundaries, for example, at the time of controlled cooling after hot rolling, at the time of ordinary cooling after rolling, or during heat treatment or other processes, if Ti(C,N) precipitates, the W will sometimes precipitate in the form of (Ti,W)(C,N). In particular, the inventors discovered by experiments that this easily occurs when there are locations at the center precipitated part of the steel plate where Ti is concentrated. This effect is similar to the effects of Nb and V in terms of phenomena, but rather than this, replacement by W tends to frequently occur. This property cannot be categorized as an effect of addition with other elements like in an equation.

To prevent W from dissolving in the Ti(C,N), various types of heat treatment and fine-tuning the production process are partially effective, but complete prevention is difficult. The inventors discovered by analysis of the results of the experiments that, basically, making Ti<0.005% and limiting the precipitation of Ti(C,N) itself are the most effective preventative measures.

That is, the second characteristic of the present invention for making the amount of W precipitation 0.0050% or less is that Ti<0.005%. The content of Ti means the Ti as an impurity including entry from the refractories.

When containing Ti in an amount of 0.005% or more, the amount of C binding with the precipitated Ti becomes 12.5 ppm or more. Even when half of this bonded Ti is substituted by W, 0.0095% precipitates. If the amount of Ti added increases, this value further rises. In practice, part of the TiC is substituted by W by a ratio of half or less, so in practice if just limiting the Ti to less than 0.005%, the precipitation of the carbides of W can be controlled.

The present invention is founded on these new discoveries and differs from the conventional technology relating to W steel.

Note that in the present invention, in addition to the above Ti, unavoidable impurities such as P, S, N, and O are included. To maintain the strength and toughness of the steel material and form a structural material, it is necessary to limit the allowable contents of these. P is 0.020% or less, preferably 0.010% or less to stably maintain the steel material high in toughness, while S is 0.0040% or less, preferably 0.0030% or less for exactly the same reason as the reason for limitation of P. N induces the precipitation of W if forming a carbonitride with Ti. It is an element which should be immobilized by Al, so its content was limited to 0.006%. If there is no limit, then it easily enters from the atmosphere in the production process. O sometimes enters from the refractories in the production process when charging the deoxidization agent Al, so the upper limit has to be managed and was made 0.0060% or less.

The above was the root of the present invention. In the present invention, it is possible to additionally add the following alloy elements so as to utilize the effect of the invention.

Ni, Co, Cu: These are all γ-phase stabilizing elements. They are effective when added to the steel material so as to improve the hardenability and raise the strength and have no effect on precipitation of W. Ni and Co further raise the toughness of the steel material, while Cu has no effect on the toughness. The effect is recognized from 0.010% in each case. When added over 0.50%, Ni segregates reverse to W to promote the microsegregation of W, so the toughness and strength sometimes vary at the different parts of the steel plate, Co is hard to add in large amounts due to the problem of production costs, and Cu sometimes causes a drop in hot workability due to grain boundary embrittlement, so the upper limit of the amount of addition was made 0.50% in all cases.

Cr, Mo: These are elements stabilizing the ferrite phase and contribute particularly remarkably to improvement of the hardenability of the steel material. The effect is recognized from 0.020% with Cr and from 0.010% with Mo. Both are carbide forming elements, so when precipitated as carbides at the time of heat treatment etc., in the same way as Nb and V, sometimes they partially dissolve the W and reduce the solution strengthening ability of the added W. When alone, the upper limits are set to 0.60% and 0.50% respectively, but when added compositely, the amounts have to be converted by EC values for limitation. Using an experiment exactly the same as the method for obtaining FIG. 1, the inventors discovered that by adding a correction formula from the amounts of addition of Cr and Mo to the EC value for addition such as with the following equation (2) so as to obtain a new EC value and making the EC value defined by equation (2) over 0.020, it is possible to control the amount of precipitation of W to 0.0050% or less.

$$EC = 2[C] - [Nb]/9 - [V]/12 - [M] \quad (2)$$

$[M] = [Cr]/23 + [Mo]/91$

Here, [C], [Nb], [V], [Cr], [Mo] are the mass % of the ingredients.

In the case of Cr and Mo, these do not have as high an affinity with C and Nb and V. In the presence of Nb and V, only extremely small amounts can be precipitated. Therefore, the coefficients become small values different from Nb or V.

B: B improves the hardenability by addition in an extremely small amount. There is no relation with the precipitation of W, so there is no limit in the alloy design with the amount of addition of W. The addition is effective from 0.0003%. If added over 0.0035%, sometimes borides are produced and the steel material is degraded in toughness, so the amount of addition was limited to 0.0003% to 0.0035%.

Further, in the present invention, as elements for controlling the mode so as to prevent the formation of the MnS most harmful in a steel material requiring toughness, one or more of Ca, Mg, La, Ce, and Y may be added alone or simultaneously. The previous group of elements and this group of elements may be added independently or simultaneously. Neither obstructs the effect of the present invention.

Ca: Ca has the function of binding with S when added into the molten steel and thereby trapping the active S in the steel. This can be added to the converter, at secondary refining, or at the time of solidification in continuous casting and effectively prevents the formation of coarse MnS. The desulfurization effect appears from 0.0003%, while when added over 0.0045%, oxide clusters are formed and the toughness of the steel material is impaired in some cases, so the range of addition was made 0.0003% to 0.0045%.

Mg: Mg similarly bonds with S to form MgS and thereby has the ability of preventing the formation of coarse MnS. In the past, steelmaking technology was still undeveloped, so this was not used very frequently, but in recent years improvements in the added alloys have made addition possible as an effective desulfurization agent. In the present invention, this Mg may also be added as a desulfurization agent. The effect is recognized from 0.0003%, while if added over 0.0045%, this segregates at the grain boundaries and lowers the hot workability of the steel material in some cases, so the upper limit was set at 0.0045%.

Y, Ce, La: These are elements having a desulfurization ability among the rare earth elements. Each has an effect similar to Ca and Mg. The effect appears from 0.001%. If added over 0.050%, oxide clusters are formed and the steel material is reduced in toughness in some cases, so the range of addition was limited to 0.001% to 0.050%.

Note that the present invention relates to high-tensile steel having a strength of the 550 MPa class or more, but if the structure is a ferrite single-phase structure, the strength target cannot be achieved. If a lattice transformation, that is, bainite transformation, occurs in the cooling transformation from the γ-phase to the α-phase and as a result a bainite structure is obtained, even if tempering the material, a fine structure will be obtained and there is the effect of improving the fracture toughness of the steel material and simultaneously introducing a large amount of dislocations in the steel and thereby improving the strength of the steel material.

In the present invention, W is utilized to the maximum extent as a in-grain solution strengthening element. Therefore, for the effect of the W to be manifested most remarkably, it is necessary to broaden the distance between dislocation motion obstacles which obstruct motion of dislocations occurring when deforming the steel material so that it is wider than the closest distance of the solid solution element W. That is, suppression of movement of dislocations by the W atoms must become the main dislocation motion obstacle. For this, the dislocation density in the steel must become $10^{12}/m^2$ to $10^{15}/m^2$ or so. At the same time, if the dislocation density in the steel is lower than $10^{12}/m^2$, the base material will become a ferrite structure and the strength will not reach the 550 MPa class, while if the dislocation density in the steel is higher than $10^{15}/m^2$, the structure will become martensite and the strength will become too high, so long heat treatment will necessarily be required to secure toughness. Therefore, the structure including bainite is made a necessary condition.

Here, the expression "bainite structure" means more particularly the case where the "upper bainite" and "lower bainite" have an area ratio of 60% or more. When the structure is complicated and its discrimination is difficult metallographically, the dislocation density should be in the range of $10^{12}/m^2$ to $10^{15}/m^2$ or so. To express the effect of the present invention, control of the structure is important. Without this limitation, the effect of inclusion of W can no longer be obtained.

Further, the present invention is not particularly limited in method of production. It is sufficient that the result include a bainite structure (including tempered structure). However, when the structure is mainly comprised of bottom bainite or even when top bainite, a hard second phase (carbides, residual austenite, etc.) is included in a large amount and toughness is difficult to secure, the material may be tempered to raise the toughness of the present invention steel. However, the present invention is, in the end, art utilizing the solution strengthening of W. Additional performed heat treatment to cause W to precipitate over 0.005% becomes unavoidable.

For this reason, the temperature in the heat treatment must be raised quickly in a range not allowing W to precipitate. That is, regardless of the heating method and means, by raising the temperature in the temperature range of 200° C. to 700° C. by a time required for heating of 1 minute to 240 minutes and holding at this temperature range for 10 minutes to 10 hours, then cooling acceleratedly by a cooling rate of 1° C./s or more or cooling naturally, the toughness of the steel material can be raised. When the time required for heating is a long time of over 240 minutes or when the holding time at the high temperature is 10 hours or more, W precipitates not as a carbide, but as the intermetallic compound $Fe_2W$ and the solution strengthening ability is lost. That is, in tempering, the rate of temperature rise and the holding time have to be watched. Without limiting these, producing W-containing solution strengthened steel while imparting industrially stable properties would be difficult—as made clear by R&D of the inventors. The temperature raising means may be a gas burner, an ordinary continuous heating facility based on a tubular furnace using the resistance heating system, a fast heat treatment facility using general induction heating facilities even with steel pipe etc., or a new heating system such as infrared rays or electric resistance heating. Use of fast heating for suppressing the precipitation of W is desirable. Note that with a material adverse to precipitation embrittlement after heating, the method of accelerated cooling to limit the time passing through the embrittlement temperature zone is also effective.

The production process of this steel itself is not particularly limited. Use of a blast furnace-converter integrated steelmaking process, use of a high purity steelmaking process using a vacuum induction heating furnace or using an electric furnace-outside-furnace refining facility, the ESR method for remelting a once produced ingot so as to reduce impurities, the strip melting method, etc. may all be utilized to produce the present invention steel. Further, the hot rolling, hot working, forging, pipemaking, and subsequent heat treatment are also not limited. The effect of the present invention can be extended with no limit in forming the steel material to the desired shape.

EXAMPLES

Figure 2:
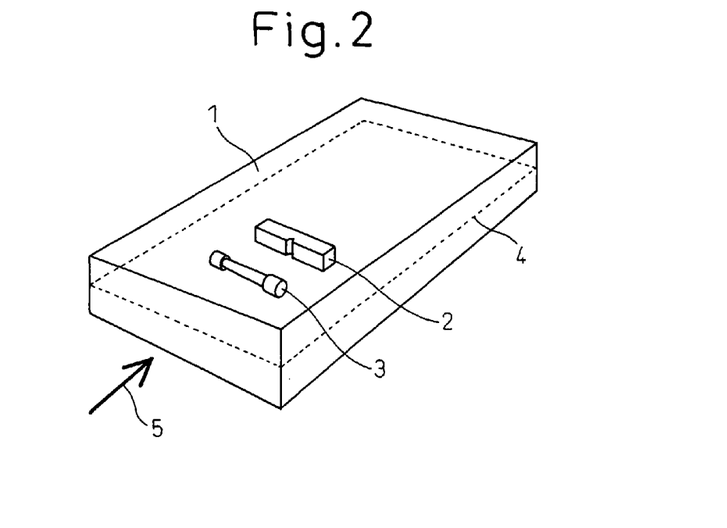
FIG. 2 is a view showing the procedure for obtaining test pieces for evaluation of the characteristics from a test piece of steel plate.

The present invention steels as described in claims 1 to 4 were run through the usual blast furnace-converter-secondary refining-continuous casting-hot rolling-heat treatment process to obtain 6 to 120 mm thick steel plate or were carried out through a separate electric furnace melting-secondary refining-ingot casting-hot forging-hot rolling-heat treatment process to similarly prepare steel plate test pieces. Some of this was subjected to the fast heat treatment of the present invention described in claim 5. The steel ingots ranged from 2 tons to 300 tons in weight and the steel plates ranged from 1.8 to 12 tons in weight with a length of 6 to 12 meters and a width of 2 to 4 meters. From the steel plate test pieces, various types of test pieces were taken from the center part in the width direction of the steel plate, the ¼ position of plate thickness, and the ½ position. Their properties were used as representative values of the properties of the steel plate. FIG. 2 is a view of the procedure for obtaining the test pieces. In FIG. 2, 1 indicates a steel plate test piece, 2 a JIS Z 2202 No. 4 test piece, 3 a JIS Z2201 No. 4 tensile test piece, 4 a center position of sheet thickness, and 5 a rolling direction of the steel plate.

The prototype steel plates were subjected to various heat treatment. Plates as hot rolled, plates tempered at the Ac1 point or less, plates quenched and tempered, plates normalized, plates tempered a plurality of times, and plates tempered, then further cold worked and annealed to relieve stress were evaluated. However, for the tempering, the accelerated heat treatment method of the present invention described in claim 6 was used to prevent the precipitation of W.

For the evaluation, a JIS Z 2201 No. 4 tensile test piece taken by the above method was used for evaluating the tensile properties, a similar JIS Z 2202 No. 4 impact test piece with a 2 mm V-notch was used to obtain a Charpy absorption energy transition curve, and the metal structure was observed in a cross-section parallel to the rolling direction by an optical microscope after corroding it to expose the structure, whereby the structure was confirmed to be bainite. Further, the W compounds present in the material were evaluated by extracting the residue by constant potential electrolysis of the base material using an organic acid, analyzing the state of presence by X-ray diffraction and the amount of W by chemical analysis, and calculating the amount of precipitation based on the stoichiochemical ratio. Each prepared steel was formed with a 30 degree V-groove, arc welded by an input heat of 200,000 J/cm, and used to obtain a JIS Z 2202 No. 4 impact test piece after welding. This was worked so that the V-groove was positioned at the fusion line, then the Charpy absorption energy was measured and used to represent the toughness of the welded joint (hereinafter referred to as the toughness of the joint).

Tables 1 to 4 show the chemical composition, tensile strength, and amount of precipitated W in the matrix of the present invention steel. Further, the value of the W precipitation control parameter EC additionally shows the toughness of the toughnesses of the matrix and welded joint at −20° C. When considering the present invention steel as structural steel, considering use in a cold region as well, an absorption energy of −20° C. of 47 J or more is usual as the minimum required value of toughness. This was therefore used as the threshold value for evaluation. That is, it was judged that a material which cannot exhibit an absorption energy of 47 J or less does not realize the object of the present invention steel. Further, as already explained, the effect of W in improving the tensile strength is manifested regardless of the material strength, but needless to say is industrially significant particularly in a material for which it is desired to raise the strength. Therefore, envisioning the case of used for high-tensile steel, a threshold value was set for this as well and the material exhibiting the above-mentioned strength of 550 MPa or more was made a condition of the present invention steel. That is, the present invention steel is limited to a steel having a strength of 550 MPa or more, containing W, and having material properties of an absorption energy at −20° C. of 47 J or more.

TABLE 1

| | Chemical composition (mass %) | | | | | | | | | | | | | | | | | | |
|---|---|---|---|---|---|---|---|---|---|---|---|---|---|---|---|---|---|---|---|
| Symbol | C | Si | Mn | P | S | Nb | V | W | Al | Ni | Cu | Co | Cr | Mo | Ca | Mg | Y | Ce | La |
| 1 | 0.036 | 0.26 | 1.08 | 0.0087 | 0.0015 | 0.048 | 0.282 | 2.847 | 0.070 | | | | | | | | | | |
| 2 | 0.085 | 0.30 | 1.05 | 0.0079 | 0.0023 | 0.057 | 0.235 | 1.065 | 0.053 | | | | | | | | | | |
| 3 | 0.045 | 0.24 | 0.20 | 0.0093 | 0.0017 | 0.042 | 0.368 | 1.026 | 0.023 | | | | | | | | | | |
| 4 | 0.060 | 0.06 | 1.51 | 0.0055 | 0.0025 | 0.036 | 0.488 | 0.838 | 0.034 | | | | | | | | | | |
| 5 | 0.075 | 0.23 | 1.27 | 0.0015 | 0.0025 | 0.067 | 0.444 | 1.224 | 0.032 | | | | | | | | | | |
| 6 | 0.052 | 0.03 | 0.44 | 0.0062 | 0.0009 | 0.062 | 0.042 | 2.438 | 0.079 | | | | | | | | | | |
| 7 | 0.041 | 0.06 | 1.91 | 0.0108 | 0.0023 | 0.013 | 0.129 | 1.004 | 0.092 | | | | | | | | | | |
| 8 | 0.035 | 0.28 | 1.82 | 0.0047 | 0.0034 | 0.049 | 0.018 | 1.273 | 0.016 | 0.220 | | | | | | | | | |
| 9 | 0.074 | 0.20 | 1.97 | 0.0066 | 0.0006 | 0.037 | 0.446 | 0.618 | 0.061 | 0.230 | 0.120 | | | | | | | | |
| 10 | 0.089 | 0.15 | 1.72 | 0.0115 | 0.0013 | 0.065 | 0.416 | 1.034 | 0.093 | 0.040 | 0.050 | 0.060 | | | | | | | |
| 11 | 0.039 | 0.20 | 1.79 | 0.0109 | 0.0020 | 0.034 | 0.023 | 2.767 | 0.043 | | | | 0.230 | | | | | | |
| 12 | 0.043 | 0.06 | 0.63 | 0.0105 | 0.0004 | 0.026 | 0.074 | 0.228 | 0.036 | | 0.180 | | | | | | | | |
| 13 | 0.078 | 0.34 | 0.63 | 0.0109 | 0.0024 | 0.040 | 0.143 | 1.057 | 0.018 | | 0.080 | 0.160 | | | | | | | |
| 14 | 0.026 | 0.33 | 0.43 | 0.0046 | 0.0031 | 0.024 | 0.332 | 0.801 | 0.038 | 0.220 | | 0.120 | | | | | | | |
| 15 | 0.067 | 0.12 | 0.53 | 0.0045 | 0.0031 | 0.056 | 0.381 | 0.948 | 0.068 | | | | 0.12 | 0.16 | | | | | |
| 16 | 0.054 | 0.28 | 1.36 | 0.0030 | 0.0027 | 0.044 | 0.289 | 0.370 | 0.029 | | | | 0.06 | 0.17 | | | | | |
| 17 | 0.049 | 0.10 | 0.58 | 0.0033 | 0.0021 | 0.058 | 0.035 | 2.184 | 0.037 | | | | | 0.16 | | | | | |

TABLE 1-continued

| | Chemical composition (mass %) | | | | | | | | | | | | | | | | | |
|---|---|---|---|---|---|---|---|---|---|---|---|---|---|---|---|---|---|---|
| Symbol | C | Si | Mn | P | S | Nb | V | W | Al | Ni | Cu | Co | Cr | Mo | Ca | Mg | Y | Ce La |
| 18 | 0.058 | 0.35 | 0.95 | 0.0121 | 0.0010 | 0.012 | 0.171 | 2.516 | 0.027 | | | | 0.32 | | | | | |
| 19 | 0.068 | 0.08 | 0.39 | 0.0101 | 0.0023 | 0.034 | 0.219 | 0.275 | 0.020 | | | | 0.31 | 0.35 | | | | |
| 20 | 0.031 | 0.37 | 1.57 | 0.0018 | 0.0028 | 0.027 | 0.037 | 0.851 | 0.057 | 0.150 | 0.160 | 0.110 | 0.083 | 0.016 | | | | |
| 21 | 0.053 | 0.14 | 0.54 | 0.0015 | 0.0032 | 0.045 | 0.182 | 1.005 | 0.051 | 0.310 | | | 0.26 | | | | | |

TABLE 2

| | Chemical composition (mass %) | | | | | Matrix TS (MPa) | Matrix vE-20 (° C.) | Joint vE-20 (° C.) | Precipitated W (mass %) | Time required for reheating Minutes (max. heating temp./° C.) |
|---|---|---|---|---|---|---|---|---|---|---|
| Symbol | B | N | O | Ti | EC | | | | | |
| 1 | | 0.0016 | 0.0041 | 0.0018 | 0.0432 | 725 | 56 | 87 | 0.0006 | |
| 2 | | 0.0019 | 0.0038 | 0.0041 | 0.1441 | 685 | 88 | 94 | 0.0005 | |
| 3 | | 0.0034 | 0.0034 | 0.0035 | 0.0546 | 644 | 97 | 105 | 0.0007 | |
| 4 | | 0.0040 | 0.0012 | 0.0036 | 0.0753 | 633 | 151 | 94 | 0.0021 | |
| 5 | | 0.0039 | 0.0013 | 0.0046 | 0.1056 | 651 | 203 | 99 | 0.0034 | |
| 6 | | 0.0041 | 0.0010 | 0.0041 | 0.0936 | 832 | 313 | 123 | 0.0035 | |
| 7 | | 0.0017 | 0.0033 | 0.0019 | 0.0698 | 815 | 366 | 105 | 0.0036 | |
| 8 | | 0.0016 | 0.0029 | 0.0029 | 0.0631 | 779 | 341 | 115 | 0.0011 | |
| 9 | | 0.0028 | 0.0008 | 0.0035 | 0.1067 | 746 | 283 | 182 | 0.0033 | |
| 10 | | 0.0017 | 0.0030 | 0.0045 | 0.1366 | 782 | 255 | 161 | 0.0036 | |
| 11 | | 0.0036 | 0.0041 | 0.0012 | 0.0723 | 681 | 267 | 154 | 0.0020 | |
| 12 | | 0.0041 | 0.0048 | 0.0024 | 0.0769 | 588 | 381 | 164 | 0.0006 | |
| 13 | | 0.0025 | 0.0007 | 0.0044 | 0.1402 | 652 | 105 | 212 | 0.0014 | |
| 14 | | 0.0040 | 0.0035 | 0.0038 | 0.0216 | 641 | 109 | 241 | 0.0008 | |
| 15 | | 0.0041 | 0.0012 | 0.0016 | 0.0900 | 687 | 336 | 244 | 0.0031 | |
| 16 | | 0.0022 | 0.0042 | 0.0013 | 0.0738 | 655 | 315 | 264 | 0.0010 | |
| 17 | | 0.0032 | 0.0029 | 0.0031 | 0.0869 | 636 | 323 | 231 | 0.0010 | |
| 18 | | 0.0032 | 0.0013 | 0.0028 | 0.0865 | 789 | 165 | 122 | 0.0028 | |
| 19 | | 0.0036 | 0.0024 | 0.0030 | 0.0966 | 666 | 171 | 141 | 0.0025 | |
| 20 | | 0.0033 | 0.0011 | 0.0016 | 0.0522 | 651 | 188 | 105 | 0.0007 | |
| 21 | 0.0006 | 0.0040 | 0.0030 | 0.0047 | 0.0745 | 682 | 312 | 215 | 0.0039 | |

Matrix TS: Result of measurement of tensile strength at center position of sheet thickness of matrix (average of two points)
Matrix vE-20: Charpy absorption energy at −20° C. at center position of sheet thickness of matrix (average of three points)
Joint vE-20: Absorption energy at −20° C. of Charpy test forming V-groove at weld joint bond (average of three points)
Precipitated W: Mass % of precipitated W obtained by quantitative analysis of constant potential electrolysis extraction residue of matrix by chemical analysis
Time required for reheating: Time required for heating during tempering with 200 to 700° C. as maximum heating temperature (figures in parentheses indicate maximum heating temperature at time of treatment)

TABLE 3

| | Chemical composition (mass %) | | | | | | | | | | |
|---|---|---|---|---|---|---|---|---|---|---|---|
| Symbol | C | Si | Mn | P | S | Nb | V | W | Al | Ni | Cu |
| 22 | 0.036 | 0.09 | 0.75 | 0.0110 | 0.0024 | 0.030 | 0.014 | 2.121 | 0.026 | 0.150 | 0.070 |
| 23 | 0.051 | 0.38 | 0.59 | 0.0026 | 0.0015 | 0.066 | 0.167 | 1.322 | 0.023 | 0.220 | |
| 24 | 0.028 | 0.22 | 0.48 | 0.0073 | 0.0015 | 0.020 | 0.131 | 0.832 | 0.042 | | |
| 25 | 0.049 | 0.39 | 0.26 | 0.0129 | 0.0026 | 0.045 | 0.093 | 1.167 | 0.082 | | |
| 26 | 0.074 | 0.35 | 1.10 | 0.0028 | 0.0007 | 0.058 | 0.058 | 0.515 | 0.062 | | |
| 27 | 0.041 | 0.33 | 1.38 | 0.0062 | 0.0032 | 0.021 | 0.089 | 2.503 | 0.080 | | |
| 28 | 0.076 | 0.34 | 0.47 | 0.0135 | 0.0032 | 0.030 | 0.441 | 0.458 | 0.086 | | |
| 29 | 0.086 | 0.07 | 1.28 | 0.0110 | 0.0031 | 0.063 | 0.118 | 1.665 | 0.045 | | |
| 30 | 0.035 | 0.25 | 1.94 | 0.0088 | 0.0032 | 0.020 | 0.025 | 0.859 | 0.093 | | |
| 31 | 0.035 | 0.07 | 1.88 | 0.0085 | 0.0016 | 0.015 | 0.124 | 1.412 | 0.055 | | |
| 32 | 0.052 | 0.33 | 0.77 | 0.0029 | 0.0006 | 0.011 | 0.165 | 1.226 | 0.038 | | |
| 33 | 0.063 | 0.39 | 0.23 | 0.0065 | 0.0018 | 0.020 | 0.473 | 2.603 | 0.087 | | |
| 34 | 0.067 | 0.04 | 0.53 | 0.0024 | 0.0030 | 0.047 | 0.396 | 0.114 | 0.049 | | |
| 35 | 0.043 | 0.38 | 0.62 | 0.0065 | 0.0031 | 0.017 | 0.065 | 1.297 | 0.084 | | |
| 36 | 0.085 | 0.25 | 0.67 | 0.0137 | 0.0004 | 0.052 | 0.327 | 2.545 | 0.061 | 0.220 | |
| 37 | 0.080 | 0.04 | 0.40 | 0.0093 | 0.0002 | 0.032 | 0.211 | 2.249 | 0.093 | 0.150 | |
| 38 | 0.045 | 0.19 | 0.85 | 0.0067 | 0.0036 | 0.059 | 0.182 | 0.381 | 0.067 | 0.180 | 0.140 |
| 39 | 0.062 | 0.14 | 0.87 | 0.0062 | 0.0024 | 0.051 | 0.264 | 1.125 | 0.081 | | |
| 40 | 0.065 | 0.33 | 0.54 | 0.0010 | 0.0023 | 0.069 | 0.334 | 0.287 | 0.094 | 0.130 | 0.070 |
| 41 | 0.086 | 0.18 | 1.34 | 0.0047 | 0.0034 | 0.045 | 0.433 | 2.659 | 0.081 | | |

| Symbol | Co | Cr | Mo | Ca | Mg | Y | Ce | La |
|---|---|---|---|---|---|---|---|---|
| 22 | | | | 0.190 | | | | |
| 23 | | 0.030 | 0.025 | 0.015 | | | | |

TABLE 3-continued

| | Chemical composition (mass %) | | | | | |
|---|---|---|---|---|---|---|
| 24 | | | 0.0008 | | | |
| 25 | | | | 0.0012 | | |
| 26 | | | | | 0.016 | |
| 27 | | | | | | 0.018 |
| 28 | | | | | | | 0.014 |
| 29 | | | | 0.0012 | | |
| 30 | | | | 0.0018 | 0.0007 | |
| 31 | | | | 0.0016 | | 0.023 | | 0.016 |
| 32 | | | | 0.0017 | | | 0.017 |
| 33 | | | | 0.0021 | | | | 0.011 |
| 34 | | | | 0.0023 | | |
| 35 | | | | 0.0031 | | |
| 36 | | | | | 0.0033 | |
| 37 | | 0.220 | 0.110 | 0.0018 | | | 0.011 |
| 38 | | | | 0.0015 | | |
| 39 | | 0.072 | 0.06 | 0.0021 | | |
| 40 | 0.016 | 0.110 | 0.110 | | | |
| 41 | | | | 0.0017 | | |

*(Note: row 28 has 0.014 in the last column; rows 31, 32, 33, 37 have additional values in later columns)*

TABLE 4

| | Chemical composition (mass %) | | | | | Matrix TS (MPa) | Matrix vE-20 (° C.) | Joint vE-20 (° C.) | Precipitated W (mass %) | Time required for reheating Minutes (max. reheating temp./° C.) |
|---|---|---|---|---|---|---|---|---|---|---|
| Symbol | B | N | O | Ti | EC | | | | | |
| 22 | 0.0015 | 0.0023 | 0.0026 | 0.0011 | 0.0654 | 804 | 296 | 206 | 0.0027 | |
| 23 | 0.0028 | 0.0017 | 0.0019 | 0.0015 | 0.0800 | 751 | 242 | 230 | 0.0020 | |
| 24 | | 0.0031 | 0.0023 | 0.0025 | 0.0429 | 648 | 315 | 286 | 0.0011 | |
| 25 | | 0.0038 | 0.0011 | 0.0048 | 0.0859 | 766 | 361 | 241 | 0.0033 | |
| 26 | | 0.0030 | 0.0049 | 0.0038 | 0.1367 | 612 | 388 | 299 | 0.0039 | |
| 27 | | 0.0018 | 0.0006 | 0.0042 | 0.0719 | 886 | 314 | 300 | 0.0029 | |
| 28 | | 0.0029 | 0.0038 | 0.0018 | 0.1118 | 643 | 326 | 300 | 0.0025 | |
| 29 | | 0.0043 | 0.0010 | 0.0013 | 0.1562 | 696 | 218 | 261 | 0.0031 | |
| 30 | | 0.0023 | 0.0027 | 0.0044 | 0.0657 | 625 | 251 | 212 | 0.0020 | |
| 31 | | 0.0019 | 0.0038 | 0.0016 | 0.0580 | 712 | 325 | 207 | 0.0018 | |
| 32 | | 0.0035 | 0.0005 | 0.0018 | 0.0890 | 731 | 96 | 72 | 0.0016 | |
| 33 | | 0.0034 | 0.0014 | 0.0032 | 0.0844 | 848 | 67 | 76 | 0.0010 | |
| 34 | | 0.0022 | 0.0034 | 0.0036 | 0.0957 | 612 | 84 | 96 | 0.0014 | |
| 35 | | 0.0042 | 0.0010 | 0.0033 | 0.0787 | 923 | 105 | 112 | 0.0038 | |
| 36 | | 0.0036 | 0.0049 | 0.0028 | 0.1370 | 689 | 164 | 105 | 0.0006 | 13 (600) |
| 37 | 0.0016 | 0.0036 | 0.0021 | 0.0017 | 0.1286 | 922 | 284 | 181 | 0.0029 | 5 (620) |
| 38 | 0.0012 | 0.0031 | 0.0037 | 0.0016 | 0.0689 | 641 | 264 | 206 | 0.0011 | 150 (550) |
| 39 | 0.0011 | 0.0033 | 0.0034 | 0.0019 | 0.0933 | 600 | 225 | 212 | 0.0022 | 180 (550) |
| 40 | 0.0017 | 0.0023 | 0.0042 | 0.0033 | 0.0884 | 675 | 234 | 206 | 0.0037 | 220 (620) |
| 41 | 0.0019 | 0.0023 | 0.0041 | 0.0034 | 0.1309 | 643 | 261 | 222 | 0.0024 | 5 (400) |

Matrix TS: Result of measurement of tensile strength at center position of sheet thickness of matrix (average of two points)
Matrix vE-20: Charpy absorption energy at −20° C. at center position of sheet thickness of matrix (average of three points)
Joint vE-20: Absorption energy at −20° C. of Charpy test forming V-groove at weld joint bond (average of three points)
Precipitated W: Mass % of precipitated W obtained by quantitative analysis of constant potential electrolysis extraction residue of matrix by chemical analysis
Time required for reheating: Time required for heating during tempering with 200 to 700° C. as maximum heating temperature (figures in parentheses indicate maximum heating temperature at time of treatment)

Tables 5 and 6 show the results of analysis and evaluation of comparative steels for the present invention. Among the comparative steels, Steel No. 50 is an example having less than the lower limit of C and an EC value of less than 0.020 and therefore not being able to secure tensile strength, Steel No. 51 is an example having excessive C and therefore not being able to secure matrix toughness, Steel No. 52 is an example having insufficient Si and insufficient deoxidation, forming oxide clusters (mainly Mn oxides), and therefore being inferior in toughness in both the matrix and joint, Steel No. 53 is an example having excessive Si, forming clusters of Si oxides, and therefore not being able to secure toughness at both the matrix and joint, Steel No. 54 is an example having insufficient amount of addition of Mn and therefore having insufficient tensile strength of the steel material, Steel No. 55 is an example having excessive Mn and therefore being inferior in toughness at both the matrix and joint, Steel No. 56 is an example having insufficient Nb, having insufficient precipitation strengthening, and therefore not being able to secure tensile strength, Steel No. 57 is an example having excessive Nb, having an EC value of 0.020 or less, not having effective action of solution strengthening by W, and therefore falling in strength and simultaneously having a large amount of coarse carbonitrides formed and therefore being inferior in toughness at both the matrix and joint, Steel No. 58 is an example having insufficient V, having a drop in precipitation strengthening ability, and therefore not being able to secure strength, Steel No. 59 is an example having excessive V, forming coarse carbonitrides, and therefore being inferior in toughness at both the matrix and joint and further having an EC value of 0.020 or less, having W precipitate along with V(C,N), and therefore having a drop in the solution strengthening ability and not being able to secure strength, Steel No. 60 is an example having insufficient W, having a drop in in-grain strengthening ability, and therefore not being able to secure tensile strength, Steel No. 61 is an example having excessive W, having large amounts of W precipitating, and therefore simultaneously suffering from deteriorated toughness and insufficient strength, Steel No. 62 is an example having insufficient Al, having insufficient deoxidation, forming Mn—Si-based oxide clusters, and therefore being inferior in toughness of the matrix, Steel No. 63 is an example having an excessive amount of addition of Al, forming coarse $Al_2O_3$ clusters, and therefore not being able to secure toughness of the matrix and joint, Steel No. 64 is an example having excessive B, having coarse BN and carboborides precipitate mainly at the grain boundaries of the weld joint bond, and therefore being inferior in joint toughness, Steel No. 65 is an example having excessive N and, despite having Al suitably added, having increased precipitation of (Nb,V)(C,N), having precipitation of W, falling in solution strengthening ability, and therefore not being able to secure tensile strength, Steel No. 66 is an example having excessively added C and therefore coarse precipitation of Cr carbides, becoming brittle at the time of tempering, and therefore being inferior in toughness both at the matrix and joint, Steel No. 67 is an example having excessively added Mo and therefore forming a large amount of $Mo_2C$ and therefore being inferior in toughness at both the matrix and joint, Steel No. 68 is an example having addition of Ti and therefore remarkable precipitation of Ti(C,N) which dissolves in the carbonitrides resulting in W being taken into the precipitate and forming the precipitated W and therefore the solution strengthening ability being lost and the strength not being able to be secured, Steel No. 69 is an example having a chemical composition entirely within the range of limits of the present invention, but having a slower rate of temperature rise at the time of tempering and therefore remarkably increasing in amount of precipitated W, falling in solid solution W, and therefore falling in strength, and Steel No. 70 is an example having only an EC value of less than the limit 0.020, having precipitation of W, falling in in-grain solution strengthening ability, and therefore having insufficient strength.

TABLE 5

| Chemical composition (mass %) | | | | | | | | | | |
|---|---|---|---|---|---|---|---|---|---|---|
| Symbol | C | Si | Mn | P | S | Nb | V | W | Al | Ni |
| 50 | 0.003 | 0.221 | 0.54 | 0.0053 | 0.0014 | 0.011 | 0.018 | 1.245 | 0.067 | |
| 51 | 0.146 | 0.283 | 0.53 | 0.0058 | 0.0015 | 0.057 | 0.458 | 1.467 | 0.070 | |
| 52 | 0.089 | 0.007 | 0.27 | 0.0063 | 0.0018 | 0.046 | 0.271 | 0.430 | 0.048 | |
| 53 | 0.025 | 0.630 | 1.10 | 0.0121 | 0.0033 | 0.014 | 0.217 | 0.856 | 0.073 | |
| 54 | 0.092 | 0.150 | 0.05 | 0.0107 | 0.0015 | 0.069 | 0.143 | 0.704 | 0.060 | |
| 55 | 0.078 | 0.317 | 4.1 | 0.0022 | 0.0005 | 0.057 | 0.140 | 1.727 | 0.039 | |
| 56 | 0.030 | 0.010 | 1.83 | 0.0112 | 0.0006 | 0.007 | 0.164 | 0.372 | 0.052 | |
| 57 | 0.031 | 0.126 | 1.73 | 0.0025 | 0.0027 | 0.121 | 0.310 | 0.215 | 0.059 | |
| 58 | 0.087 | 0.144 | 1.92 | 0.0020 | 0.0031 | 0.063 | 0.003 | 2.872 | 0.025 | |
| 59 | 0.045 | 0.181 | 1.78 | 0.0131 | 0.0003 | 0.062 | 0.87 | 2.722 | 0.085 | |
| 60 | 0.035 | 0.220 | 0.60 | 0.0014 | 0.0020 | 0.063 | 0.422 | 0.006 | 0.077 | |
| 61 | 0.059 | 0.279 | 0.93 | 0.0137 | 0.0020 | 0.015 | 0.079 | 4.12 | 0.068 | |
| 62 | 0.029 | 0.166 | 1.95 | 0.0012 | 0.0003 | 0.029 | 0.070 | 0.378 | 0.005 | |
| 63 | 0.058 | 0.358 | 1.56 | 0.0100 | 0.0032 | 0.047 | 0.294 | 1.623 | 0.186 | |
| 64 | 0.035 | 0.085 | 1.45 | 0.0098 | 0.0029 | 0.045 | 0.479 | 2.522 | 0.031 | 0.21 |
| 65 | 0.067 | 0.134 | 1.98 | 0.0081 | 0.0032 | 0.013 | 0.112 | 0.779 | 0.066 | |
| 66 | 0.043 | 0.059 | 1.85 | 0.0086 | 0.0007 | 0.020 | 0.363 | 1.242 | 0.044 | 0.15 |
| 67 | 0.055 | 0.130 | 0.77 | 0.0055 | 0.0019 | 0.061 | 0.342 | 1.433 | 0.082 | |
| 68 | 0.033 | 0.238 | 1.97 | 0.0114 | 0.0024 | 0.059 | 0.266 | 0.319 | 0.086 | |
| 69 | 0.041 | 0.283 | 0.37 | 0.0119 | 0.0024 | 0.012 | 0.011 | 1.684 | 0.013 | 0.21 |
| 70 | 0.017 | 0.164 | 0.20 | 0.0049 | 0.0027 | 0.067 | 0.093 | 1.717 | 0.068 | 0.31 |

| Symbol | Cu | Co | Cr | Mo | Ca | Mg | Y | Ce | La |
|---|---|---|---|---|---|---|---|---|---|
| 50 | | | | | | | | | |
| 51 | | | | | | | | | |
| 52 | | | | | | | | | |
| 53 | | | | | | | | | |
| 54 | | | | | | | | | |
| 55 | | | 0.230 | | | | | | |
| 56 | | | | 0.110 | | | | | |
| 57 | | | 0.130 | 0.150 | | | | | |
| 58 | | | | | | | | | |
| 59 | | | 0.180 | | | | | | |
| 60 | | | | | | | | | |
| 61 | | | | | | | | | |
| 62 | | | 0.036 | 0.420 | | | 0.0120 | | |
| 63 | | | 0.120 | | | 0.0009 | | | |
| 64 | | | | 0.040 | 0.0012 | | | 0.0150 | |
| 65 | 0.17 | 0.15 | | | 0.0011 | | | | 0.0160 |
| 66 | | | 0.740 | 0.030 | 0.0007 | | 0.0230 | | |
| 67 | 0.13 | | 0.060 | 0.890 | 0.0009 | | | 0.0420 | |
| 68 | | 0.11 | | | 0.0014 | | 0.0360 | | |
| 69 | 0.10 | | | 0.015 | 0.0017 | | | | 0.0310 |
| 70 | 0.17 | | | | 0.0008 | | | | |

TABLE 6

| Symbol | Chemical composition (mass %) | | | | | Matrix TS (MPa) | Matrix vE-20 (° C.) | Joint vE-20 (° C.) | Precipitated W (mass %) | Time required for reheating Minutes (max. reheating temp./° C.) |
|---|---|---|---|---|---|---|---|---|---|---|
| | B | N | O | Ti | EC | | | | | |
| 50 | | 0.0041 | 0.0044 | 0.0041 | 0.0033 | 486 | 96 | 88 | 0.0061 | |
| 51 | | 0.0033 | 0.0031 | 0.0023 | 0.2475 | 612 | 13 | 15 | 0.0043 | |
| 52 | | 0.0036 | 0.0096 | 0.0017 | 0.1500 | 723 | 41 | 16 | 0.0032 | |
| 53 | | 0.0037 | 0.0045 | 0.0011 | 0.0304 | 728 | 18 | 14 | 0.0028 | |
| 54 | | 0.0032 | 0.0036 | 0.0015 | 0.1640 | 522 | 112 | 105 | 0.0012 | |
| 55 | 0.0008 | 0.0034 | 0.0041 | 0.0018 | 0.1279 | 644 | 21 | 27 | 0.0013 | |
| 56 | | 0.0026 | 0.0042 | 0.0016 | 0.0439 | 496 | 130 | 104 | 0.0007 | |
| 57 | 0.0010 | 0.0029 | 0.0018 | 0.0017 | 0.0149 | 696 | 38 | 7 | 0.0077 | 180 (520) |
| 58 | 0.0012 | 0.0026 | 0.0013 | 0.0019 | 0.1667 | 446 | 115 | 103 | 0.0018 | 180 (590) |
| 59 | 0.0011 | 0.0024 | 0.0016 | 0.0016 | 0.0027 | 531 | 171 | 112 | 0.0078 | 180 (620) |
| 60 | | 0.0024 | 0.0012 | 0.0015 | 0.0273 | 496 | 180 | 151 | 0.0018 | 200 (620) |
| 61 | 0.0011 | 0.0031 | 0.0007 | 0.0014 | 0.1104 | 524 | 16 | 13 | 0.0099 | 200 (620) |
| 62 | | 0.0031 | 0.0078 | 0.0031 | 0.0428 | 703 | 24 | 64 | 0.0026 | |
| 63 | | 0.0030 | 0.0008 | 0.0044 | 0.0808 | 712 | 15 | 19 | 0.0027 | |
| 64 | 0.0051 | 0.0028 | 0.0007 | 0.0036 | 0.0246 | 715 | 104 | 38 | 0.0022 | |
| 65 | | 0.0084 | 0.0006 | 0.0012 | 0.1229 | 531 | 151 | 123 | 0.0067 | 200 (600) |
| 66 | 0.0015 | 0.0016 | 0.0006 | 0.0041 | 0.0220 | 804 | 41 | 17 | 0.0032 | 180 (680) |
| 67 | 0.0012 | 0.0014 | 0.0012 | 0.0031 | 0.0617 | 816 | 31 | 18 | 0.0042 | 200 (420) |
| 68 | 0.0011 | 0.0032 | 0.0031 | 0.0095 | 0.0373 | 521 | 206 | 166 | 0.0120 | 220 (300) |
| 69 | 0.0016 | 0.0033 | 0.0032 | 0.0016 | 0.0796 | 509 | 207 | 121 | 0.4220 | 450 (620) |
| 70 | 0.0013 | 0.0014 | 0.0033 | 0.0018 | 0.0188 | 533 | 312 | 286 | 0.0085 | 12 (650) |

Matrix TS: Result of measurement of tensile strength at center position of sheet thickness of matrix (average of two points)
Matrix vE-20: Charpy absorption energy at −20° C. at center position of sheet thickness of matrix (average of three points)
Joint vE-20: Absorption energy at −20° C. of Charpy test forming V-groove at weld joint bond (average of three points)
Precipitated W: Mass % of precipitated W obtained by quantitative analysis of constant potential electrolysis extraction residue of matrix by chemical analysis
Time required for reheating: Time required for heating during tempering with 200 to 700° C. as maximum heating temperature (figures in parentheses indicate maximum heating temperature at time of treatment)

INDUSTRIAL APPLICABILITY

A steel material able to simultaneously achieve strength and toughness at both the matrix and weld heat affected zone in high-tensile steel having a tensile strength of the 550 MPa class or more by application of the present invention can be industrially inexpensively supplied. Application of high efficiency welding raised in weld input heat becomes possible in high-tensile steel, production of welded structures becomes easier, and a reduction in work period and reduction in installation costs can be contributed to.

The invention claimed is:

1. High-tensile steel material with excellent weldability and toughness, and with a tensile strength in at least the 550 MPa class, the high-tensile steel material consisting of, by mass %:
C: 0.005 to 0.10%,
Si: 0.01 to 0.40%,
Mn: 0.10 to 3.0%,
Al: 0.010 to 0.10%,
W: 0.10 to 3.0%,
V: 0.010 to 0.50%, and
Nb: 0.010 to 0.080%, and
a balance of Fe and unavoidable impurities, wherein
B: 0.0003 to 0.0035%, Ca: 0.0003 to 0.0045%, Mg: 0.0003 to 0.0045%, Y: 0.001 to 0.050%, Ce: 0.001 to 0.050%, and La: 0.001 to 0.050% are optionally present, and
P, S, N, O, and Ti are present at most as impurities in amounts of: to
P: 0.020% or less,
S: 0.0040% or less,
N: 0.006% or less,
O: 0.0060% or less,
Ti: less than 0.005%, and
Cr: 0.020 to 0.60%; wherein EC* as given by the following equation is greater than 0.020:

$$EC^* = 2[C] - [Nb]/9 - [V]/12 - [M]$$

where, [M]=[Cr]/23, and
where [C], [Nb], [V], and [Cr] represent the mass % of C, Nb, and V; and wherein
W precipitation is present in the steel material in an amount of 0.0050 mass % or less, based on an analytical value obtained by quantitative analysis of potential electrolysis extraction residue by fluorescent X-ray analysis, and
60 area % or more of the structural composition of the high-tensile steel material in a cross-section of the steel has a bainite structure.

2. The high-tensile steel material according to claim 1, wherein the W is present in an amount of 0.851 to 3.0%.

3. High-tensile steel material with excellent weldability and toughness, and with a tensile strength in at least the 550 MPa class, the high-tensile steel material consisting of, by mass %,
C: 0.005 to 0.10%,
Si: 0.01 to 0.40%,
Mn: 0.10 to 3.0%,
Al: 0.010 to 0.10%,
W: 0.10 to 3.0%,
V: 0.010 to 0.50%,
Nb: 0.010 to 0.080%, and
a balance of Fe and unavoidable impurities, wherein
one or more of
Ni: 0.010 to 0.50%,
Cu: 0.010 to 0.50%, and
Co: 0.010 to 0.50% are optionally present, and
one or more of B: 0.0003 to 0.0035%, Ca: 0.0003 to 0.0045%, Mg: 0.0003 to 0.0045%, Y: 0.001 to 0.050%, Ce: 0.001 to 0.050%, and La: 0.001 to 0.050% are optionally present, and P, S, N, O, and Ti are present at most as impurities in amounts of:
P: 0.020% or less,
S: 0.0040% or less,
N: 0.006% or less,
O: 0.0060% or less, and
Ti: less than 0.0038%, wherein
EC given by the following equation is greater than 0.020:

$$EC=2[C]-[Nb]/9-[V]/12, \text{wherein}$$

[C], [Nb], [V] represent the mass % of C, Nb, and V; and wherein

W precipitation is present in the steel material in an amount of 0.0039 mass % or less, based on an analytical value obtained by quantitative analysis of potential electrolysis extraction residue by fluorescent X-ray analysis, and 60 area % or more of the structural composition of the high-tensile steel material in a cross-section of the steel has a bainite structure.

4. The high-tensile steel material according to claim 3, wherein the W is present in an amount of 0.851 to 3.0%.

5. A method of production of high-tensile steel material according to claim 3, with excellent weldability and toughness and with tensile strength of the 550 MPa class or more, wherein 60% or more of the structural composition of the high-tensile steel material in a cross-section of the steel has a bainite structure, and W precipitation is present in the high tensile steel material in an amount of 0.0050% or less, based on an analytical value obtained by quantitative analysis of potential electrolysis extraction residue by fluorescent X-ray analysis, the method comprising:

rough rolling and final rolling a steel slab without heating or heating by sensible heat after casting, then immediately cooling the rolled slab by accelerated or natural cooling at a cooling rate of 1° C./s or more to provide a rolled steel having a bainite structure, raising the temperature of the cooled rolled steel to a temperature of 200° to 700° C. in time period of 1 to 240 minutes, holding the heated steel at 200° to 700° C. for 10 minutes to 10 hours, and then cooling the heated steel by accelerated or natural cooling at a cooling rate of 1° C./s or more; wherein the steel slab comprises, by mass %, C: 0.005 to 0.10%, Si: 0.01 to 0.40%, Mn: 0.10 to 3.0%, Al: 0.010 to 0.10%, W: 0.10 to 3.0%, V: 0.010 to 0.50%, Nb: 0.010 to 0.080%, and a balance of Fe and unavoidable impurities, wherein P, S, N, O, and Ti are present at most as impurities in amounts of: P: 0.020% or less, S: 0.0040% or less, N: 0.006% or less, O: 0.0060% or less, and Ti: less than (0.005%) 0.0038%.

* * * * *

UNITED STATES PATENT AND TRADEMARK OFFICE
CERTIFICATE OF CORRECTION

PATENT NO. : 8,882,936 B2  
APPLICATION NO. : 11/661054  
DATED : November 11, 2014  
INVENTOR(S) : Yasushi Hasegawa et al.

Page 1 of 1

It is certified that error appears in the above-identified patent and that said Letters Patent is hereby corrected as shown below:

In the Claims

Column 21, line 23, Claim 5 change "according to claim 3, with" to -- according to claim 3 with --;

Column 22, lines 24-25, Claim 5 change "Ti: less than (0.005%) 0.0038%." to

-- Ti: less than 0.0038%. --.

Signed and Sealed this
Sixteenth Day of June, 2015

Michelle K. Lee
*Director of the United States Patent and Trademark Office*